(12) United States Patent
Naganawa et al.

(10) Patent No.: US 7,886,420 B2
(45) Date of Patent: Feb. 15, 2011

(54) METHOD OF MANUFACTURING DOUBLE PIPE

(75) Inventors: Hiroki Naganawa, Nishio (JP); Shun Kurata, Kariya (JP); Fumiaki Nakamura, Kariya (JP); Kinji Ochiai, Kasugai (JP); Hiroki Ohara, Takahama (JP); Hiroki Oguchi, Kariya (JP)

(73) Assignees: Denso Corporation, Kariya (JP); DENSO Airs Corporation, Anjo (JP)

( * ) Notice: Subject to any disclaimer, the term of this patent is extended or adjusted under 35 U.S.C. 154(b) by 985 days.

(21) Appl. No.: 11/647,469

(22) Filed: Dec. 28, 2006

(65) Prior Publication Data
US 2007/0246117 A1 Oct. 25, 2007

(30) Foreign Application Priority Data
Dec. 28, 2005 (JP) .............................. 2005-379874

(51) Int. Cl.
B23P 11/00 (2006.01)
F16L 9/18 (2006.01)

(52) U.S. Cl. .................. 29/525.13; 29/525.14; 29/516; 29/508; 29/507; 29/890.036; 29/890.053

(58) Field of Classification Search ............ 29/890.036, 29/890.053, 890.054, 507, 508, 515, 516, 29/523, 525.13, 525.14; 285/123.3, 382, 285/288.6, 288.5, 289.3, 289.2; 138/114
See application file for complete search history.

(56) References Cited

U.S. PATENT DOCUMENTS

| | | | | |
|---|---|---|---|---|
| 1,703,037 A | * | 2/1929 | Heck | 228/136 |
| 3,777,343 A | * | 12/1973 | D'Onofrio | 29/890.036 |
| 5,718,131 A | * | 2/1998 | Bobbitt, III | 70/184 |
| 5,937,500 A | * | 8/1999 | Bobbitt, III | 29/516 |
| 6,092,287 A | * | 7/2000 | Thoms | 29/897.2 |
| 6,866,090 B2 | * | 3/2005 | Takamatsu et al. | 165/41 |
| 2004/0178627 A1 | | 9/2004 | Takasaki | |

(Continued)

FOREIGN PATENT DOCUMENTS

DE 34 15 077 C1 9/1985

(Continued)

OTHER PUBLICATIONS

Office Action dated Jan. 13, 2009 in German Application No. 06 061 048.2.

(Continued)

Primary Examiner—Essama Omgba
(74) Attorney, Agent, or Firm—Harness, Dickey & Pierce, PLC (57) ABSTRACT

A method of manufacturing a double pipe includes a step of inserting a straight inner pipe into a straight outer pipe such that the inner pipe and the outer pipe are positioned at a predetermined relative position, a step of fixing a first end portion of the outer pipe to the inner pipe so as to form a first fixing portion, a step of bending the outer pipe and the inner pipe at the same time at a predetermined portion so as to form at least one bending portion after the fixing step of the first end portion, and a step of fixing a second end portion of the outer pipe to the inner pipe so as to form a second end portion after the bending.

15 Claims, 6 Drawing Sheets

U.S. PATENT DOCUMENTS

| | | |
|---|---|---|
| 2006/0096314 A1 | 5/2006 | Nakamura et al. |
| 2006/0096744 A1 | 5/2006 | Nakamura et al. |
| 2006/0112556 A1 | 6/2006 | Nakamura et al. |
| 2008/0141665 A1* | 6/2008 | Yusa .......................... 60/320 |

FOREIGN PATENT DOCUMENTS

| | | |
|---|---|---|
| JP | 55-133167 | 3/1954 |
| JP | 55-1906 | 1/1980 |
| JP | 59-027714 | 2/1984 |
| JP | 63-119936 | 5/1988 |
| JP | 4-260789 | 9/1992 |
| JP | 4-119324 | 10/1992 |
| JP | 4-300071 | 10/1992 |
| JP | 07-18092 | 3/1995 |
| JP | 09250888 A * | 9/1997 |
| JP | 2002-013882 | 1/2002 |
| JP | 2003-119844 | 4/2003 |
| JP | 2004-12114 | 1/2004 |
| JP | 2004-245389 | 9/2004 |
| JP | 2004-346344 | 12/2004 |

OTHER PUBLICATIONS

Office Action dated Mar. 14, 2008 in Chinese Application No. 2006 1017 1150.4 with English translation thereof.

Office Action dated Jun. 5, 2009 in Chinese Application No. 2006 10171150.4.

U.S. Appl. No. 11/634,024, filed Dec. 2006, Kurata et al.

Office Action dated Aug. 24, 2010 in corresponding Japanese Application No. 2005-379874.

* cited by examiner

METHOD OF MANUFACTURING DOUBLE PIPE

CROSS REFERENCE TO RELATED APPLICATION

This application is based on Japanese Patent Application No. 2005-379874 filed on Dec. 28, 2005, the contents of which are incorporated herein by reference in its entirety.

BACKGROUND OF THE INVENTION

1. Field of the Invention

The present invention relates to a method of manufacturing a double pipe, in which an inner pipe is inserted into an outer pipe.

2. Description of Related Art

A double pipe used in an air conditioner is generally bent to have bending portions. The double pipe is bent by using a bender after a straight inner pipe is inserted into a straight outer pipe (e.g., JP-A-2004-245389, JP-A-2004-270916 corresponding to US 2004/0178627A1).

A manufacturing method of a double pipe having a bending portion is described in JP-A-2003-119844. In this method, a straight inner pipe is made longer than a straight outer pipe and is inserted into the straight outer pipe. Then, the inserted inner pipe and the outer pipe are bent at the same time without fixing its end parts, and the inner pipe is moved within a clearance range between both the inner pipe and the outer pipe in the bending portion so as to adjust the position of its end parts. However, in this case, because the bending is performed without fixing the end portions of both the outer and inner pipes, position error of the end portions becomes larger than a predetermined position range.

To overcome this problem, the end portions of the outer pipe and the inner pipe may be fixed during the bending. However, in this case, a large elastic energy is stored as residual stress in the inner pipe after the bending. Accordingly, when this double pipe is used for a vehicle air conditioner, the double pipe may be easily damaged due to a vibration of a compressor of the air conditioner or a vibration of the vehicle, etc.

The residual stress stored in the inner pipe may be removed after bending by performing an annealing process. However, in this case, the bent angle of the double pipe may be changed during the annealing, and manufacturing cost is increased due to the annealing process.

SUMMARY OF THE INVENTION

It is an object of the present invention to provide a method of manufacturing a double pipe, which can prevent the foregoing problem.

It is another object of the present invention to provide a method of manufacturing a double pipe, by which each end portion of inner pipe and outer pipe of the double pipe can be suitably positioned in a predetermined position range while preventing an excess remain stress from being stored in a bending process of the double pipe.

According to an aspect of the present invention, a method of manufacturing a double pipe includes a step of forming a straight inner pipe having a predetermined length, a step of forming a straight outer pipe having a diameter larger than a diameter of the inner pipe, a step of inserting the inner pipe into the outer pipe such that the inner pipe and the outer pipe are positioned at a predetermined relative position, a step of fixing a first end portion of the outer pipe to the inner pipe so as to form a first fixing portion, a step of bending the outer pipe and the inner pipe at the same time at a predetermined portion so as to form at least one bending portion after the fixing of the first end portion, and a step of fixing a second end portion of the outer pipe, opposite to the first end portion, to the inner pipe so as to form a second end portion after the bending. Accordingly, each end portion of inner pipe and outer pipe of the double pipe can be suitably positioned in a predetermined position range while preventing an excess remain stress from being stored in the bending process.

For example, the step of the bending may include a plurality of bending steps for forming a plurality of bending portions in the double pipe. In this case, the bending steps are performed such that the bending portions are formed in order from a bending portion close to the first fixing portion toward the second fixing portion.

Furthermore, in the fixing step of the first end portion of the outer pipe, the first end portion of the outer pipe may be radially contracted and may be fastened to the inner pipe so as to form the first fixing portion. Similarly, in the fixing step of the second end portion of the outer pipe, the second end portion of the outer pipe may be radially contracted and may be fastened to the inner pipe so as to form the second fixing portion.

Alternatively, in the fixing step of the first end portion of the outer pipe, a first part of the inner pipe to be fixed to the first end portion of the outer pipe may be radially expanded and may be fastened to the first end portion of the outer pipe so as to form the first fixing portion. Similarly, in the fixing step of the second end portion of the outer pipe, a second part of the inner pipe to be fixed to the second end portion of the outer pipe may be radially expanded and may be fastened to the second end portion of the outer pipe so as to form the second fixing portion. Furthermore, the first end portion of the outer pipe at the first fixing portion may be bonded to the inner pipe by using a brazing material after the first fixing portion having been fastened is formed. Similarly, the second end portion of the outer pipe at the second fixing portion may be bonded to the inner pipe by using a brazing material, after the second fixing portion having been fastened is formed.

Furthermore, in the forming step of the outer pipe, a taper portion may be formed on an inner peripheral surface of at least one of the first end portion and the second end portion of the outer pipe to be thinned toward its tip end. In this case, in the bonding step of the one of the first end portion and the second end portion of the outer pipe, the brazing material is introduced into a clearance between the inner pipe and the one of the first end portion and the second end portion of the outer pipe through an enlarged space due to the taper portion.

Alternatively, the forming step of the first fixing portion may include a step of bonding the outer pipe to the inner pipe at the first fixing portion, and the forming step of the second fixing portion may include a step of bonding the outer pipe to the inner pipe at the second fixing portion. Alternatively, the forming step of the first fixing portion may include a step of fixing a first connection member to the inner pipe and the outer pipe at the first fixing portion, and a step of bonding the outer pipe to the inner pipe through the first connection portion. Similarly, the forming step of the second fixing portion may include a step of fixing a second connection member to the inner pipe and the outer pipe at the second fixing portion, and a step of bonding the outer pipe to the inner pipe through the second connection portion.

Alternatively, in the forming step of the inner pipe, first and second parts of the inner pipe, to be bonded to the first and second end portions of the outer pipe, respectively, may be expanded radially outwardly to have an outer diameter that is slightly smaller than an inner diameter of the first and second end portions of the outer pipe before the fixing. In this case, in the step of bonding the outer pipe to the inner pipe at the first fixing portion, the first part of the inner pipe may be directly bonded to the first end portion of the outer pipe using the brazing material. Furthermore, in the step of bonding the outer pipe to the inner pipe at the second fixing portion, the second part of the inner pipe may be directly bonded to the second end portion of the outer pipe using the brazing material, after the bonding is performed.

BRIEF DESCRIPTION OF THE DRAWINGS

The above and other objects, features and advantages will become more apparent from the following detailed description made with reference to the accompanying drawings. In the drawings.

DETAILED DESCRIPTION

An embodiment of the present invention will be now described with reference to FIGS. 1 to 12.

A double pipe 160 in this embodiment can be used in a refrigeration cycle device 100B of an air conditioner 100 for a vehicle.

Figure 1:
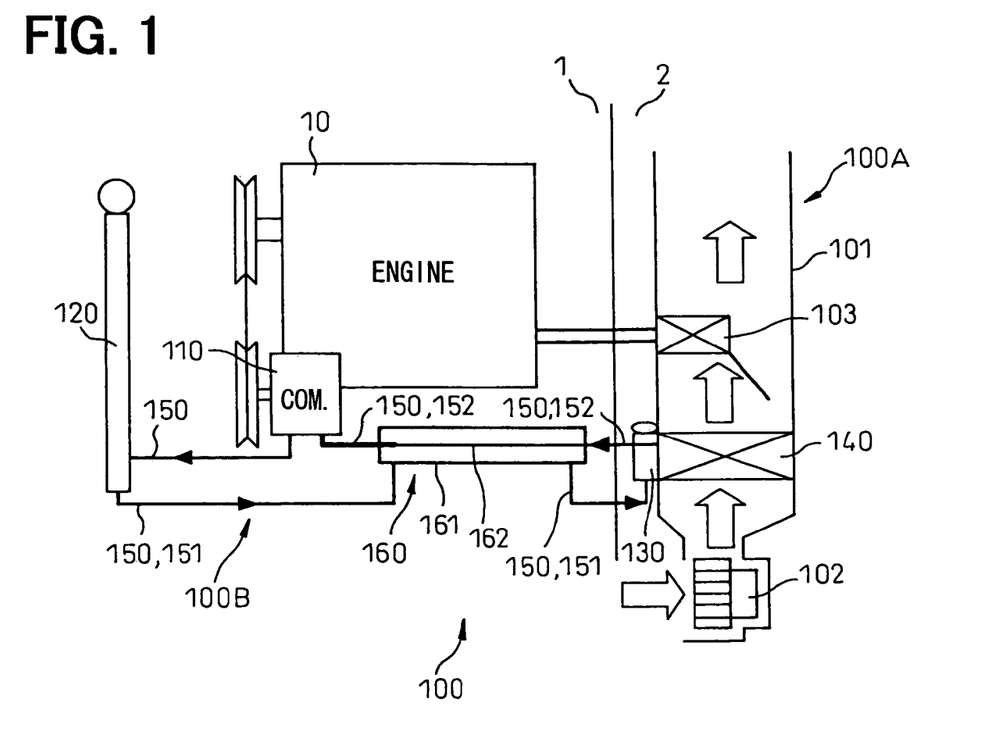
FIG. 1 is a schematic diagram showing an air conditioner for a vehicle.

As shown in FIG. 1, a vehicle is separated into an engine compartment 1 for an engine 10 and a passenger compartment 2 for occupants by a dash panel. An interior unit 100A is disposed in an instrument panel in the passenger compartment 2, and the refrigeration cycle device 100B (except for an expansion valve 130 and an evaporator 140) is disposed in the engine compartment 1. The air conditioner 100 is constructed with the interior unit 100A and the refrigeration cycle device 100B.

The interior unit 100A includes a blower 102, the evaporator 140 and a heater core 103 which are located in an air-conditioning case 101. The blower 102 selectively sucks outside air or inside air of the vehicle, and sends the sucked air to the evaporator 140 and the heater core 103. The evaporator 140 evaporates refrigerant when the refrigeration cycle device 100B operates so as to cool air passing therethrough. The evaporator 140 is a heat exchanger for cooling air by a latent heat of the refrigerant evaporation. The heater core 103 is a heat exchanger for heating the air from the evaporator 140 by using hot water flowing from the engine 10 as a heating source.

In addition, an air mixing door is disposed adjacent to the heater core 103 in the air-conditioning case 101, so as to adjust a mixing ratio of air cooled by the evaporator 140 and air heated by the heater core 103. Thus, the mixed conditioned air has a predetermined temperature set by the occupant.

Pipes 150 connect a compressor 110, a condenser 120, the expansion valve 130 and the evaporator 140 in this order in the refrigeration cycle device 100B, so as to form a closed cycle. The double pipe 160 is disposed as in a part of the pipes 150, as an example.

The compressor 110 compresses refrigerant to have a high-temperature and a high-pressure in the refrigeration cycle device 100B and is driven by the engine 10. That is, a pulley is fixed to a driving axis of the compressor 110, and a driving force from the engine 10 can be transmitted to the pulley through a driving belt or the like.

The condenser 120 is connected to a refrigerant discharging side of the compressor 110. The condenser 120 is a heat exchanger for cooling or condensing refrigerant by exchanging heat with outside air, and operates as a refrigerant radiator or a gas cooler.

The expansion valve 130 is a decompressor for decompressing the refrigerant discharged from the condenser 120 to be expanded. A throttle, a valve or an ejector may be used as the expansion valve 130. The expansion valve 130 is disposed adjacent to the evaporator 140 in the interior unit 100A. The expansion valve 130 thermally controls its opening degree such that refrigerant flowing from the evaporator 140, i.e., refrigerant sucked by the compressor 110, has a predetermined superheat degree. For example, the predetermined superheat degree is equal to or less than 5° C. Furthermore, the predetermined superheat degree may be set in a range between 0° C. and 3° C. such that the refrigerant flowing from the evaporator 140 is hardly superheated.

The evaporator 140 is a low-pressure side heat exchanger for cooling air, as described above. The evaporator 140 operates as a cooling unit or a heat absorber. A refrigerant outlet side of the evaporator 140 is connected to a refrigerant suction side of the compressor 110.

The pipes 150 include a high-pressure pipe 151 for flowing a high-temperature and high-pressure refrigerant before being decompressed by the expansion valve 130, and a low-pressure pipe 152 for flowing a low-temperature and low-pressure refrigerant having been cooled and decompressed. The high-pressure pipe 151 extends from the compressor 110 through the condenser 120 to the expansion valve 130, and the low-pressure pipe 152 extends from the evaporator 140 to the compressor 110. The double pipe 160 has a double-wall pipe structure. The double pipe 160 is provided for fluid communication for at least a part of the pipes 150 and is used as a refrigerant pipe for the air conditioner 100.

Figure 2:
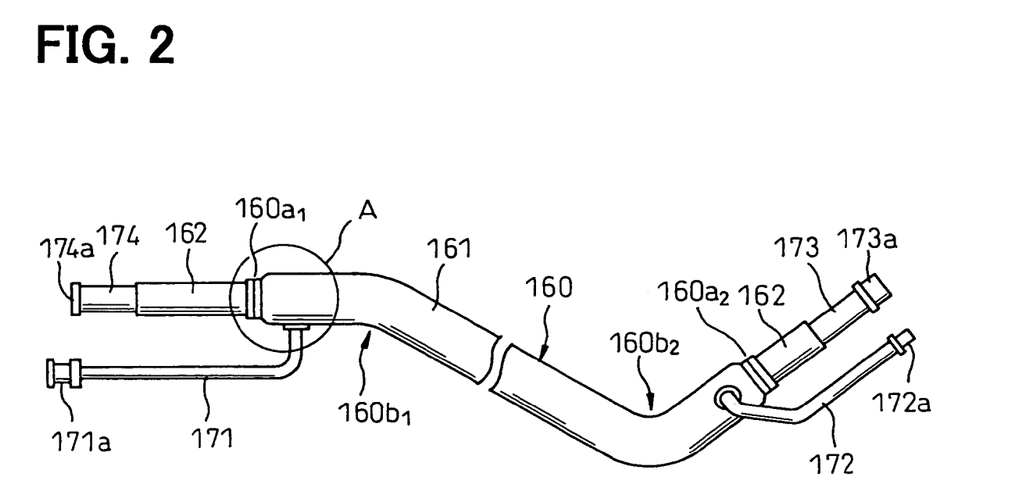
FIG. 2 is a front view showing a double pipe used for the air conditioner according to an embodiment of the present invention.

An example structure of the double pipe 160 will be now described with reference to FIGS. 2 and 3. In this example, the double pipe 160 has a total length in a range of 700 mm-900 mm. The double pipe 160 includes a straight portion and plural bending portions 160b1, 160b2 in order to fit amongst other devices, e.g., engine 10, or a vehicle body. The double pipe 160 is positioned in the engine compartment 1, in this embodiment.

The double pipe 160 includes an outer pipe 161 and an inner pipe 162, which are respectively formed. The inner pipe 162 passes through an interior of the outer pipe 161. In one example, the outer pipe 161 is a φ22 mm-pipe (external diameter: 22 mm, internal diameter: 19.6 mm) and made of aluminum, for example. An entire periphery of a first end portion 161a1 of the outer pipe 161 in a longitudinal direction is contracted radially inside and is fastened to the inner pipe 162 to form a first fixing portion 160a1 in the double pipe, after the inner pipe 162 is inserted into the outer pipe 161. Similarly, an entire periphery of a second end portion 161a2 of the outer pipe 161 in the longitudinal direction is contracted radially inside and is fastened to the inner pipe 162 to form a second fixing portion 160a2 in the double pipe, after the inner pipe 162 is inserted into the outer pipe 161 and a bending process of the double pipe 160 is performed. Then, the first and second end portions 161a1, 161a2 of the outer pipe 161 are brazed to the outer surface of the inner pipe 162 (e.g., external diameter: 19.1 mm) air-tightly and liquid-tightly so as to form brazed junctions in the first and second fixing portions 160a1, 160a2. Thus, a passage, i.e., space, 160c is formed between the inner surface of the outer pipe 161 and the outer surface of the inner pipe 162, as shown in FIG. 3.

The outer pipe 161 is provided with first and second apertures 161d1, 161d2 (burring apertures) adjacent to the first and second end portions 161a1, 161a2, respectively, for communicating the passage 160c to an outside. The first and second apertures 161d are spaced by predetermined distances from the respective edge of the first and second end portions 161a1, 161a2 of the outer pipe 161. Each aperture 161d1, 161d2 is formed with a flange that extends outward from the outer pipe 161. Liquid pipes 171, 172 made of aluminum are coupled to the flanges of the first and second apertures 161d1, 161d2, respectively. For instance, in this embodiment, the liquid pipes 171, 172 of the high-pressure pipe 151 are brazed to the apertures 161d1, 161d2, respectively. A tip end of the liquid pipe 171 can be connected to the condenser 120 by a joint 171a. Furthermore, a tip end of the liquid pipe 172 can be connected to the expansion valve 130 by a joint 172a. Therefore, high-pressure refrigerant flows through the liquid pipe 171, the passage 160c between in the outer pipe 161 and the inner pipe 162, and the liquid pipe 172.

In contrast, in this embodiment, the inner pipe 162 is a ¾ inch-pipe (external diameter: 19.1 mm, internal diameter: 16.7 mm) made of aluminum, for example. Two end portions of the inner pipe 162 in the longitudinal direction are connected respectively to suction pipes 173, 174 that are made of aluminum and form the low-pressure pipe 152, as shown in FIG. 2. The suction pipe 173 of the inner pipe 162 is connected to the evaporator 140 by the joint 173a, and the suction pipe 174 of the inner pipe 162 is connected to the compressor 110 by the joint 174a, so that the evaporator 140 is coupled to the compressor 110 through the inner pipe 162 of the double pipe 160. That is, low-pressure refrigerant from the evaporator 140 flows through the suction pipe 173, the inner pipe 162 and the suction pipe 174.

Figure 3:
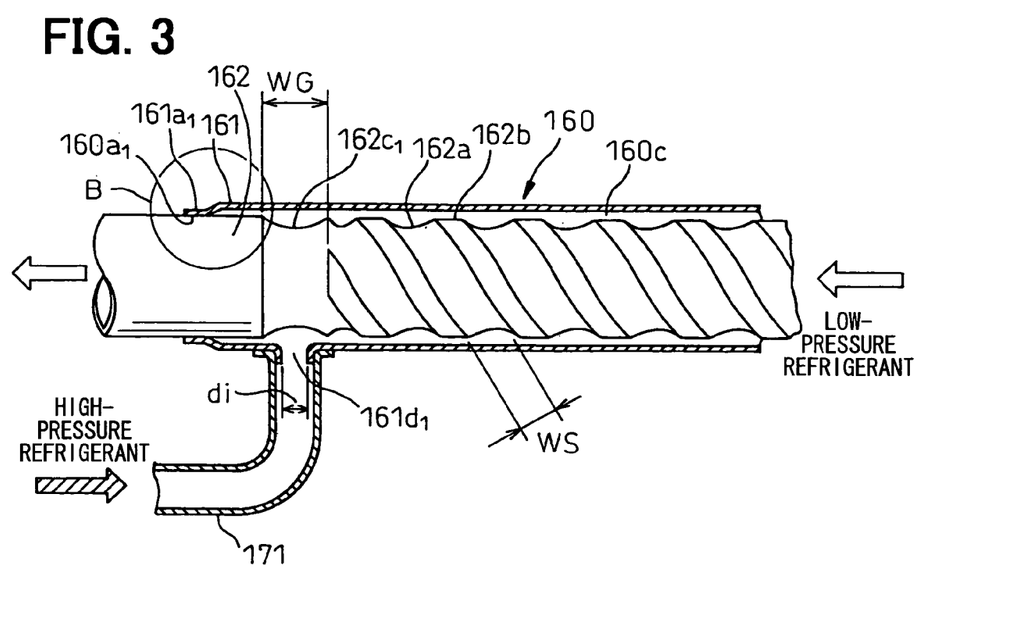
FIG. 3 is a cross-sectional view showing the part of the double pipe indicated at A in FIG. 2.
Figure 4:
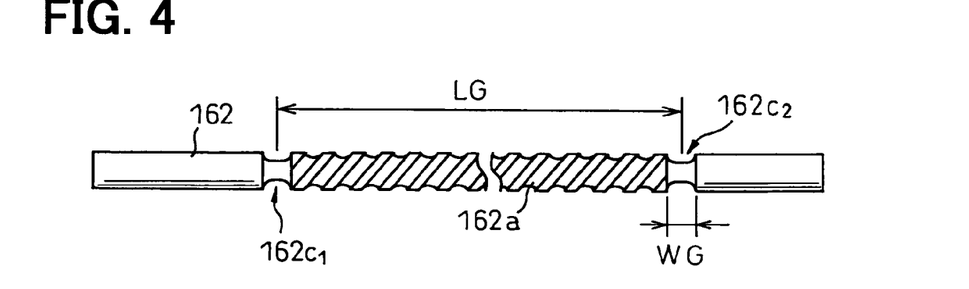
FIG. 4 is a front view showing an inner pipe before an inserting in a manufacturing method of a double pipe, according to the embodiment.

As shown in FIGS. 3 and 4, a first round groove 162c1 having a width WG and extending in a circumferential direction of the inner pipe 162 is formed on the outer surface of the inner pipe 162, at a position corresponding to the aperture 161d1. Similarly, a second round groove 162c2 having the width WG and extending in a circumferential direction of the inner pipe 162 is formed on the outer surface of the inner pipe 162, at a position corresponding to the aperture 161d2, as shown in FIG. 4. Furthermore, a helical groove 162a is formed on the outer surface of the inner pipe 162 between the first and second round groove 162c1, 162c2 to increase volume of the passage 160c between the inner pipe 161 and the outer pipe 162. The helical groove 162a has a width WS that is narrower than the width WG of the first and second round groove 162c1, 162c2.

The first round groove 162c1 is provided at a position corresponding to the aperture 161d1 of the outer pipe 161 connected to the liquid pipe 171, and the second round groove 162c2 is provided at a position corresponding to the aperture 161d2 of the outer pipe 161 connected to the liquid pipe 172. The width WG of the first and second round grooves 162c1, 162c2 is set larger than the inner diameter di of the apertures 161d1, 161d2, so that the aperture 161d1, 161d2 is positioned within the width of the round groove 162c1, 162c2 after the bending process of the double pipe is performed. In this embodiment, the width WG of the round groove 162c1, 162c2 is set approximately twice of the inner diameter di of the aperture 161d1, 161d2.

The helical groove 162a is connected to the first and second round grooves 162c1, 162c2, and has multiple (three in this embodiment) threads helically extending in a longitudinal direction of the inner pipe 162 between the first and second round grooves 162c1, 162c2. A peak portion 162b is formed between the spiral grooves 162a, and an external dimension of the peak portion 162b is approximately equal to an outer diameter of the inner pipe 162. Generally, the external dimension (outer diameter dimension) of the peak portion 162b is slightly smaller than the outer diameter of the inner pipe 162 without having any groove. The passage 160c between the inner pipe 162 and the outer pipe 161 is enlarged by the grooves 162c, 162a.

Next, a method of manufacturing the double pipe 160 will be now described with reference to FIGS. 4 to 12.

First, a straight inner pipe 162 cut by a predetermined length is formed and prepared, as shown in FIG. 4. The first and second round grooves 162c1, 162c2 each of which has the groove width WG and the helical groove 162a having the groove width WS are formed in the prepared straight inner pipe 162 shown in FIG. 4. Here, the distance between the first round groove 162c1 and the second round groove 162c2 is LG. The grooves 162a, 162c1, 162c2 can be formed on the inner pipe 162 by using a generally known method. For example, the groove 162a, 162c1, 162c2 is formed to have predetermined depth and shape by pressing the surface of the inner pipe using a round steel roller while the inner pipe is set in an axial direction with a rotation.

Figure 5:
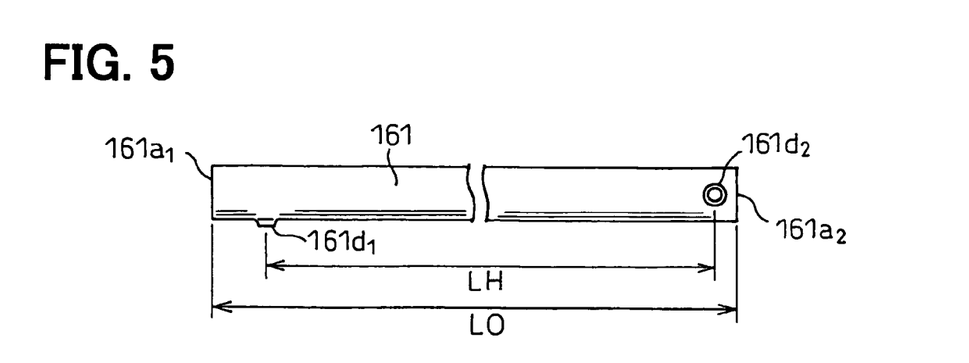
FIG. 5 is a front view showing an outer pipe before the inserting of the inner pipe in the manufacturing method of the double pipe, according to the embodiment.

Next, as shown in FIG. 5, a straight outer pipe 161 cut by a predetermined length LO that is shorter than the length of the inner pipe 162 is formed and prepared. The outer pipe 161 is formed with the first aperture 161d1 protruding outside at a position close to the first end portion 161a1, and the second aperture 161d2 protruding outside at a position close to the second end portion 161a2. Here, the distance LH between the first and second apertures 161d1 and 161d2 that is set longer than the distance LG between the first round groove 162c1 and the second round groove 162c2. Both the distances LH and LG are set based on contraction amount of the inner pipe 162 and the outer pipe 161 such that the positions of the first and second apertures 161d1, 161d2 correspond to the first and second round grooves 162c1, 162c2, respectively.

Figure 6:
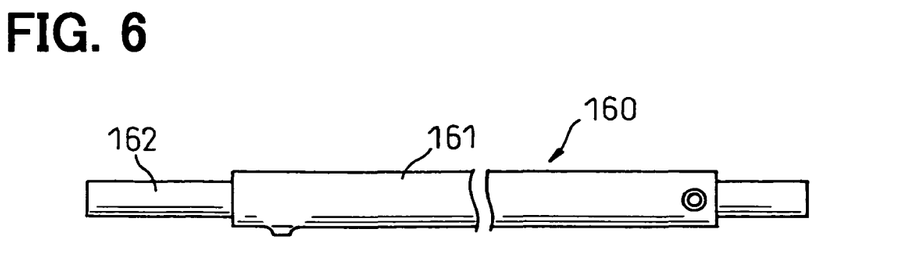
FIG. 6 is a schematic front view showing a step of positioning the outer pipe and the inner pipe in the manufacturing method of the double pipe, according to the embodiment.

Next, as shown in FIG. 6, the straight inner pipe 162 is inserted into the straight outer pipe 161 to be positioned at a predetermined position.

Figure 7:
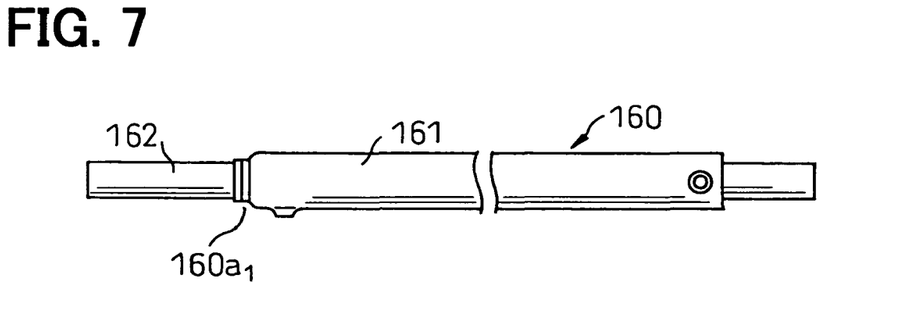
FIG. 7 is a schematic front view showing a step of forming a first fixing portion of the double pipe, according to the embodiment.
Figure 8:
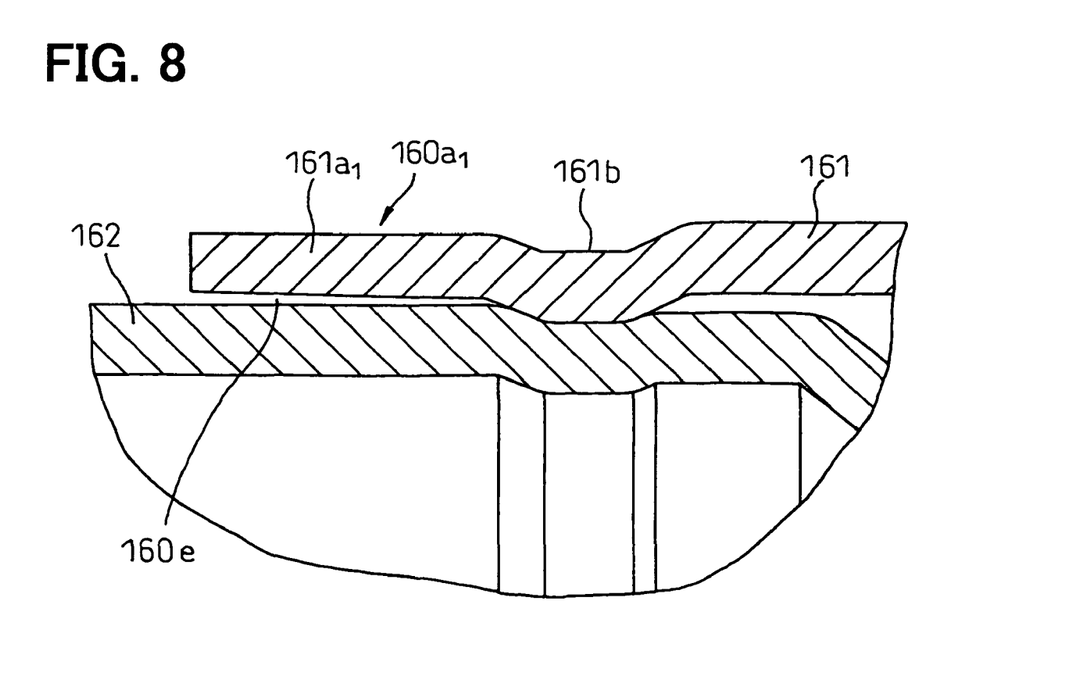
FIG. 8 is a cross sectional view showing a structure of the first fixing portion of the double pipe.

Next, as shown in FIG. 7, the first end portion 161a1 of the outer pipe 161 is contracted radially inside to be fastened to the inner pipe 162, so as to form the first fixing portion 160a1 of the double pipe 160. Therefore, the first fixing portion 160a1 has a fastened portion 161b that is formed at a position spaced by a distance of 3 mm-7 mm from the tip end of the outer pipe 161, as shown in FIG. 8. Because the fastened portion 161b is contracted radially inside, the inner diameter of the outer pipe 161 is slightly smaller than the outer diameter of the inner pipe 162 at the fastened portion 161b of the first fixing portion 160a1. That is, the outer pipe 161 is press-fitted into the surface of the inner pipe 162 at the fastened portion 161, as shown in FIG. 8. As a result, not only the outer pipe 161 but also the inner pipe 162 are contracted radially inside in the fastened portion 161b. The contraction dimension of the inner pipe 162 in the radial direction at the fastened portion 161b is smaller than the plate thickness of the inner pipe 162. The fastened portion 161b of the outer pipe 161 is formed into a pedestal shape in a cross section in the radial direction, approximately along the whole circumference of the outer pipe 161. Furthermore, as shown in FIG. 8, a small clearance 160e is formed between the inner surface of the outer pipe 161 and the outer surface of the inner pipe 162 at an outer side from the fastened portion 161b. That is, the end portion 161a of the outer pipe 161 between a center area of the fastened portion 161b to the tip end of the outer pipe 161 does not completely tightly sealed to the outer surface of the inner pipe 162, but is slightly spaced from the outer surface of the inner pipe 162 by the clearance 160e.

The radially contracting of the outer pipe 161 can be performed by using a circular fastening jig having plural divided fan-shaped flat portions, for example. When an inserting hole for inserting the outer pipe is formed in the center portion of the circular fastening jig, the outer periphery of the inserting hole in the fastening jig can be used as pressing chips for pressing the outer pipe 161.

When the forming of the first fixing portion 160a1 of the double pipe 160 is ended, the center of the first aperture 161d1 is placed at a position approximately corresponding to the center of the first round groove 162c1. However, in this state, the center of the second aperture 161d2 does not correspond to the center of the second round groove 162c2.

Figure 9:
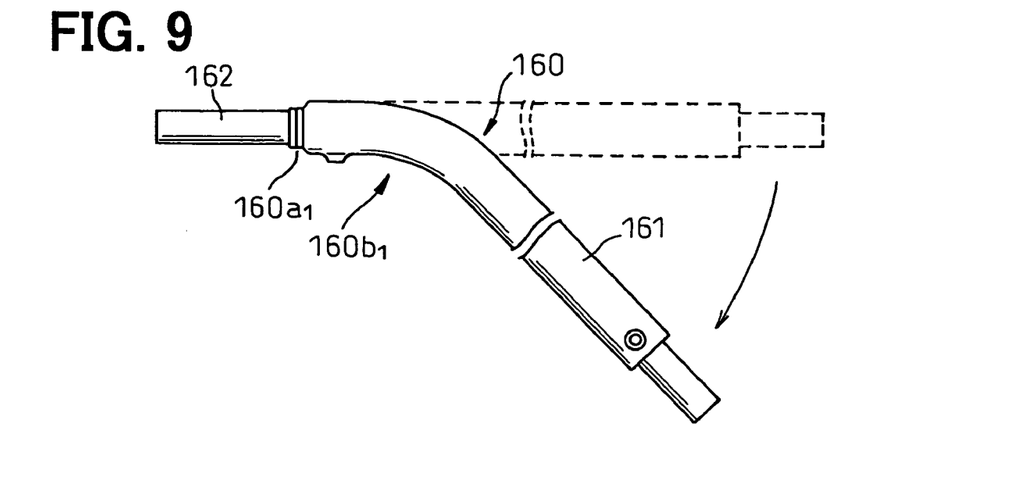
FIG. 9 is a schematic diagram showing a first bending process of the double pipe, according to the first embodiment.

At the next step, as shown in FIG. 9, the outer pipe 161 and the inner pipe 162 are bent at the same time at a first predetermined position by using a bender, so as to form a first bending portion 160b1. That is, a first bending step for forming the first bending portion 160b1 at a side of the first fixing portion 160a1 is performed after the first fixing portion 160a1 is formed.

Figure 10:
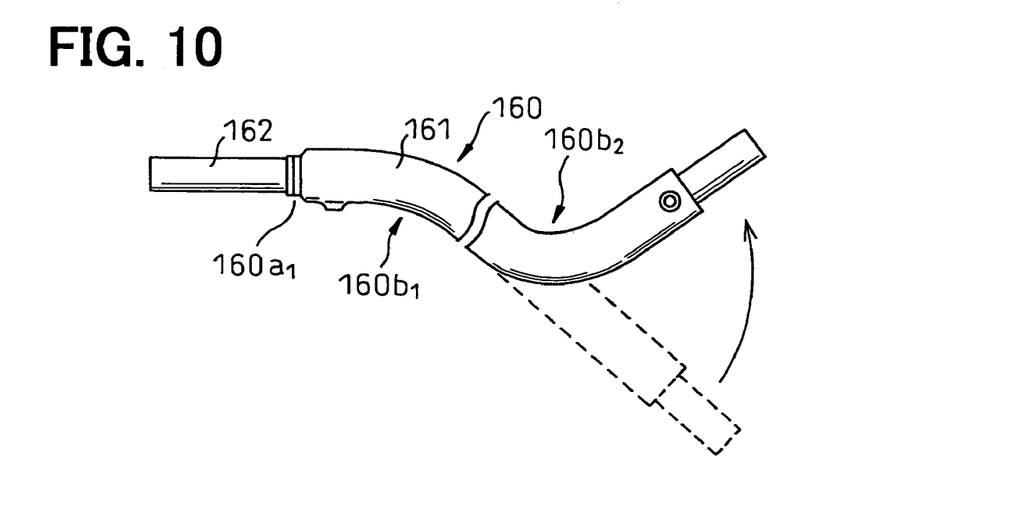
FIG. 10 is a schematic diagram showing a second bending process of the double pipe, according to the first embodiment.

Then, as shown in FIG. 10, the outer pipe 161 and the inner pipe 162 are bent at the same time at a second predetermined position by using a bender, so as to form a second bending portion 160b2. That is, a second bending step for forming the second bending portion 160b2 at the second predetermined position that is far from the first fixing portion 160a1 as compared with the first predetermined position.

Figure 11:
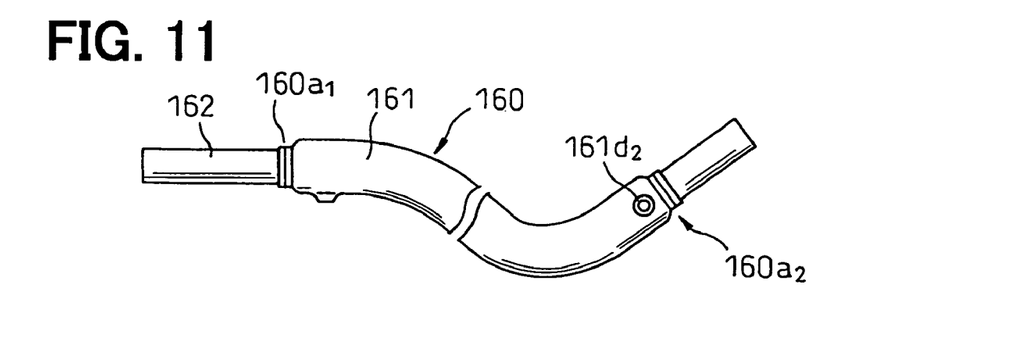
FIG. 11 is a schematic side view showing a step of forming a second fixing portion of the double pipe, according to the embodiment.

Next, as shown in FIG. 11, the second end portion 161a2 of the outer pipe 161 is radially contracted and is fastened to the inner pipe 162 so as to form the second fixing portion 160a2, similarly to the first fixing portion 160a1.

While the second fixing portion 160a2 is formed, the position of the second aperture 161d2 is made to correspond to the position of the second round groove 162c2. Therefore, in this embodiment, by suitably setting the condition of the bending process, the dimensions of pipe elements and the dimensions of LD and LH, a position error of the second fixing portion 160a2 and the second aperture 161d2 can be controlled within a predetermined range. Accordingly, in this embodiment, when the double pipe. 160 is formed, the inner diameter di of the aperture 161d1, 161d2 can be made to be positioned within the width range WG of the round groove 162c1, 162c2. That is, even when the center position of the aperture 161d1, 161d2 does not completely correspond to the center position of the width range WG of the round groove 162c1, only when the aperture 161d1, 161d2 is positioned within the width range WG of the round groove 162c1, the double pipe 160 can be suitably used as a refrigerant pipe.

Figure 12:
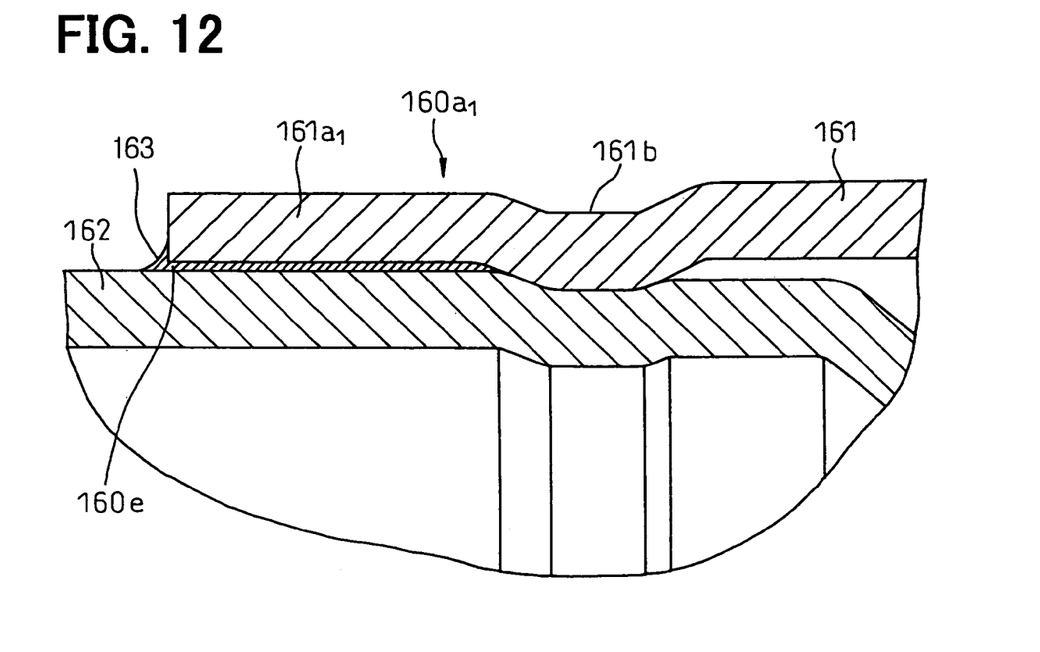
FIG. 12 is an enlarged cross-sectional view showing a bonding process using a brazing material, in the first fixing portion of the double pipe, according to the embodiment.

Next, as shown in FIG. 12, the first end portion 161a1 of the outer pipe 161 at the first fixing portion 160a1 is bonded to the inner pipe 162 such that the clearance 160e between the inner surface of the outer pipe 161 and the outer surface of the inner pipe 162 is filled with a brazing material 163 so as to air-tightly or water-tightly sealed. In the brazing process, the fastened portion 161b prevent the brazing material 163 from entering to inside more than the fastened portion 161b. The second end portion 161a2 of the outer pipe 161 at the second fixing portion 160a2 is also brazed as a similar method.

With the above steps, the forming steps of the double pipe 160 having the two bending portions 160b1, 160b2 can be finished. Thereafter, the double pipe 160 is bonded to pipes such as the liquid pipes 171, 172 and the suction pipes 173, 174 at predetermined positions, so that the piping structure shown in FIG. 2 is formed.

According to this embodiment, the bending portions 160b1, 160b2 are formed after the first fixing portion 160a1 is formed, and the second fixing portion 160a2 is formed after the bending portions 160b1, 160b2 are formed. Because the bending for forming the bending portions 160b1, 160b2 is performed at a free state of the second fixing portion 160a2 without being fixed, it can prevent an excessive remain stress from being stored in the double pipe during the bending. Furthermore, because the first fixing portion 160a1 is formed before the bending, the inner pipe 162 and the outer pipe 161 can be easily positioned at a predetermined position range after the bending is performed.

In the above-described embodiment, the first fixing portion 160a1 and the second fixing portion 160a2 are formed by contracting the first end portion 161a1 and the second end portion 161a2 of the outer pipe 161 radially inside. However, the first and second fixing portions 160a1 and 160a2 can be formed by radially expanding first and second parts of the inner pipe 162. In this case, the first part of the inner pipe 162 to be fixed to the first end portion 161a1 of the outer pipe 161 is radially expanded and is fastened to the first end portion 161a1 of the outer pipe 161 so as to form the first fixing portion 161a1. Similarly, the second part of the inner pipe 162 to be fixed to the second end portion 161a2 of the outer pipe 161 is radially expanded and is fastened to the second end portion 161a2 of the outer pipe 161 so as to form the second fixing portion 161a2.

In the above-described embodiment, the double pipe 160 is provided with the two bending portions 160b1, 160b2. However, a double pipe having plural bending portions more than two can be formed by using the above-described method. That is, when plural bending portions 160b1, 160b2, 160b3, . . . 160bn are formed in a double pipe in this order from the first fixing portion 160a1, bending process is performed in this order of the bending portions 160b1, 160b2, 160b3, . . . 160bn from the first fixing portion 160a1. Then, after the last bending portion 160bn is formed by bending, the second fixing portion 160a2 is formed. The method of this embodiment can be used for forming a double pipe having a single bending portion. In this case, after the first fixing portion 160a1 is formed, the single bending portion is formed by a bender. Thereafter, the second fixing portion 160a2 is formed.

In the above-described embodiment, the brazing of the first fixing portion 160a1 is performed after the bending process for forming the bending portions 160b1, 160b2 is performed. However, the brazing of the first fixing portion 160a1 can be performed before the bending process for forming the bending portions 160b1, 160b2 is performed.

Figure 13:
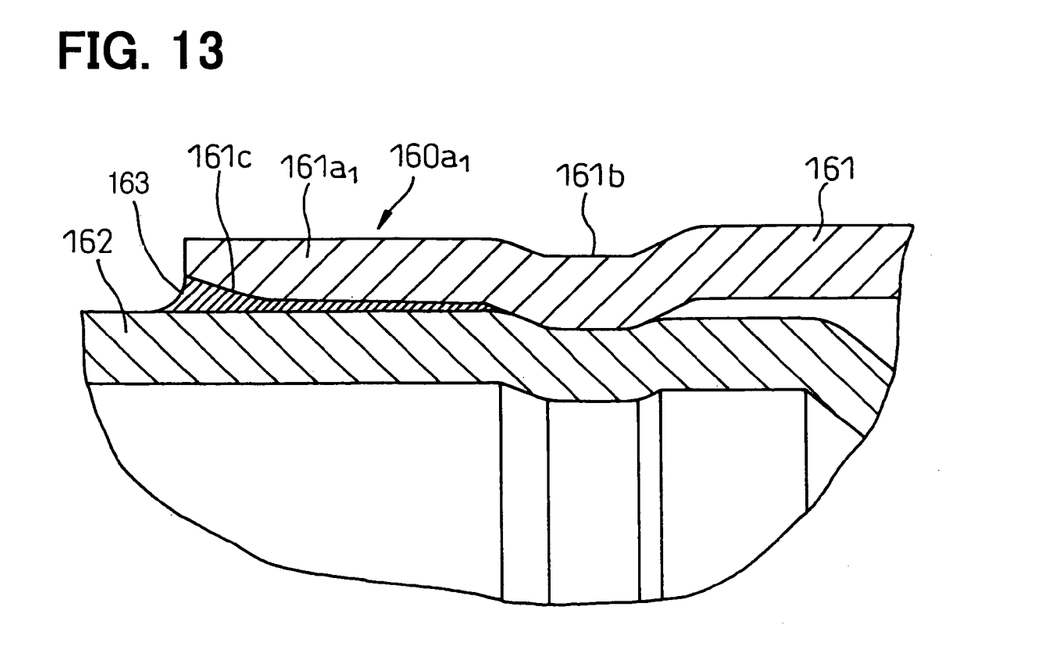
FIG. 13 is an enlarged cross-sectional view showing a first fixing portion of a double pipe, having a taper portion on an inner peripheral surface of its end portion, according to a modification of the embodiment of the present invention.

FIG. 13 is a view corresponding to the cross sectional view of FIG. 12, and shows the first fixing portion 160a1 of the double pipe 160 after the brazing process is performed after the fastening of the first fixing portion 160a1. In FIG. 13, a taper portion 161c is provided on an inner peripheral surface of an end part of the outer pipe 161. That is, within the first end portion 161a1 of the outer pipe 161, the inner peripheral surface of the end part close to the tip end of the outer pipe 161 is tapered radially outside so that the clearance 160e between the outer pipe 161 and the inner pipe 162 can be made larger. The second end portion 161a2 of the outer pipe 161 can be formed to have the taper portion 161c, similarly to that of the first end portion 161a1. The taper portion 161c can be formed while the outer pipe 161 is formed and prepared. By forming the taper portion 161c in the outer pipe 161, the brazing material 163 can be easily introduced into the clearance 160e through a space due to the taper portion 161c in the first end portion 160a1 even when the clearance 160e caused due to the radially contracting of the outer pipe 161 is small.

Figure 14:
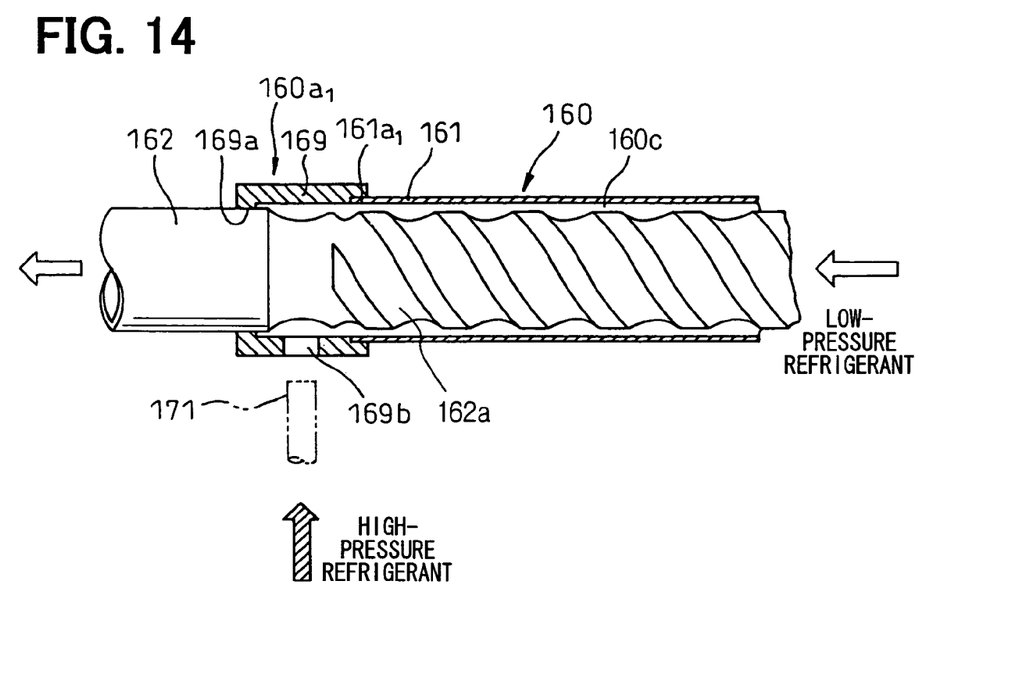
FIG. 14 is a cross sectional view showing a first fixing portion of a double pipe in which an outer pipe and an inner pipe are bonded using a brazing material through a connection member, according to another modification of the embodiment of the present invention.

FIG. 14 shows a modification example of the double pipe 160. In this example of FIG. 14, the first end portion 161a1 of the outer pipe 161 extends to a portion where the helical groove 162a is formed in the inner pipe 162, close to the round groove of the inner pipe 162. Furthermore, a cylindrical connection member 169 made of aluminum is connected to the inner pipe 162 and the first end portion 161a1 of the outer pipe 161. That is, the outer pipe 161 and the inner pipe 162 are bonded to each other through the connection member 169 by brazing. The connection member 169 has an inner pipe inserting hole 169a in its cylindrical bottom part, into which the inner pipe 162 is inserted, and a hole 169b at its cylindrical side part.

In this example of FIG. 14, in order to form the first fixing portion 160a1, the inner peripheral surface of the inner pipe inserting hole 169a and the outer peripheral surface of the inner pipe 162 are fitted, before the bending. Furthermore, the end portion 161a1 of the outer pipe 161 is fitted into an opening portion of the connection member 169, opposite to the inner pipe inserting hole 169a, and is brazed to the opening portion of the connection member 169. Then, the bending process is performed. After all the bending portions are formed in order, the second fixing portion 160a2 can be formed, similarly to the forming method of the first fixing portion 160a1 in FIG. 14.

In this example of FIG. 14, the aperture 161d1 described above is not provided, but the hole 169b provided in the cylindrical side part of the connection member 169 is used as the aperture 161d1. Thus, after the forming of the double pipe 160 is finished, the liquid pipe 171 or 172 is bonded to the periphery of the hole 169b of the connection member 169.

Figure 15:
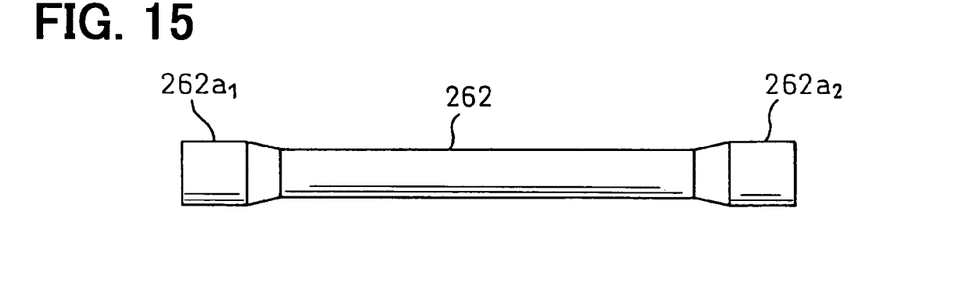
FIG. 15 is a front view showing an inner pipe before inserting in an outer pipe for forming a double pipe, according to another modification of the embodiment of the present invention.
Figure 16:
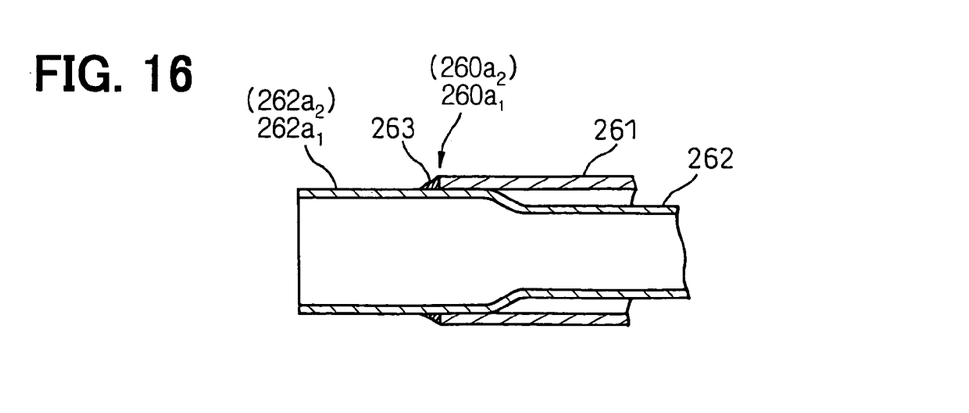
FIG. 16 is a cross sectional view showing a first fixing portion of the double pipe according to the modification of FIG. 15.

FIGS. 15 and 16 show a double pipe 260 according to another modification example. The double pipe 260 includes an outer pipe 261 and an inner pipe 262 that is inserted into the outer pipe 261 and is fixed to the outer pipe 261. In this example of FIGS. 15 and 16, the outer wall surface of the inner pipe 262 is a cylindrical surface without a helical groove. In addition, the inner pipe 262 is provided with first and second expanded end portions 262a1, 262a2 having expanded diameter. That is, in the forming and preparing step of the inner pipe 262, the inner pipe 262 having the first and second expanded portions 262a1, 262a2 and a cylindrical portion between the first and second expanded portions 262a1, 262a2 is formed. The first and second expanded portions 262a1, 262a2 of the inner pipe 262 have an outer diameter approximately equal to the inner diameter of the outer pipe 161. Generally, the diameter of the first and second expanded portions 262a1, 262a2 of the inner pipe 262 is slightly smaller than the inner diameter of the outer pipe 261. Therefore, the inner pipe 262 can be easily positioned at a predetermined position when the inner pipe 262 is inserted into the outer pipe 261.

As shown in FIG. 16, after the inner pipe 262 is inserted into the outer pipe 261, one end portion of the outer pipe 261 is bonded to the outer surface of the first expanded portion 262a1 of the inner pipe 262 by using a brazing material 263 so as to form a first fixing portion 260a1. After all bending portions are formed in the double pipe 260 in order, the other end portion of the outer pipe 261 is bonded to the outer surface of the second expanded portion 262a2 of the inner pipe 262 by brazing so as to form a second fixing portion 260a2 of the double pipe 260, similarly to the first fixing portion 260a1.

Instead of the expanded end portions 162a1, 162a2 of the inner pipe 162, an inner pipe without an expanded end portion may be used. In this case, the end portions of the outer pipe is contracted in a radial direction so that the inner pipe is bonded to the inner surfaces of the contracted end portions of the outer pipe by brazing. Even in this case, a first fixing portion between the inner pipe and the outer pipe is formed at one end portion of the double pipe, and a second fixing portion between the inner pipe and the outer pipe is formed at the other end portion of the double pipe after bending process is performed.

In the above-described embodiment and modification examples, the fixing between the inner pipe 162, 262 and the outer pipe 161, 261 is performed by combining the fastening process and the brazing process. However, as the fixing means, rivets may be used. Furthermore, the inner pipe 162, 262 and the outer pipe 161, 261 can be fixed by welding such as a spot welding, a melt welding and a laser welding.

In the above-described embodiment and modification examples, the first and second fixing portions 160a1, 160a2, 260a1, 260a2 of the double pipe 160, 260 can be formed by different fixing methods.

The inner pipe 162, 262 and the outer pipe 161, 261 of the double pipe 160, 260 may be made of other metal or a metal alloy. For example, the inner pipe 162, 262 and the outer pipe 161, 261 can be made of steel, stainless steel, copper, or copper alloy.

The method of the present invention can be suitably used for forming a double pipe in which the length of the inner pipe is approximately equal to the length of the outer pipe.

Furthermore, the refrigeration cycle device 100 may be used for a home air conditioner. In this case, outside air of the outer pipe 161 may be lower compared with air within the engine compartment 1. Therefore, a low-pressure refrigerant may flow in the passage 160*c*, and a high-pressure refrigerant may flow in the inner pipe 162, based on a heat-exchanging performance between the high-pressure refrigerant and the low-pressure refrigerant.

Further, the double pipe 160, 260 may be used for any suitable device other than an air conditioner, such as an inner heat exchanger for a refrigeration cycle. For example, the double pipe 160, 260 may be used for an inner heat exchanger for a refrigeration cycle including carbon dioxide as refrigerant.

Further, fluid flowing in the double pipe 160, 260 may not be limited to refrigerant for the refrigeration cycle device 10B. The fluid may be of any suitable type. Also, refrigerant having a different physical property may be selected. For example, a combination of refrigerants can be used, in which flowing directions, temperatures and pressures of the refrigerants are different.

Such changes and modifications are to be understood as being within the scope of the present invention as defined by the appended claims.

What is claimed is:

1. A method of manufacturing a double pipe, the method comprising:
    forming a straight inner pipe having a predetermined length, the straight inner pipe defining a first and a second round groove;
    forming a straight outer pipe having a diameter larger than a diameter of the inner pipe, the straight outer pipe defining a first and a second aperture;
    inserting the inner pipe into the outer pipe such that the first groove of the inner pipe and the first aperture of the outer pipe are aligned;
    fixing a first end portion of the outer pipe to the inner pipe so as to form a first fixing portion;
    bending the outer pipe and the inner pipe at the same time at a predetermined portion so as to form at least one bending portion, after the forming of the first fixing portion; and
    fixing a second end portion of the outer pipe, opposite to the first end portion, to the inner pipe so as to form a second fixing portion, after the bending, the second groove of the inner pipe being aligned with the second aperture of the outer pipe when the fixing of the second end portion of the outer pipe is performed.

2. The method of manufacturing a double pipe according to claim 1, wherein:
    the bending includes a plurality of bending steps for forming a plurality of bending portions; and
    the bending steps are performed such that the bending portions are formed in order from a bending portion close to the first fixing portion toward the second fixing portion.

3. The method of manufacturing a double pipe according to claim 1, wherein:
    in the fixing of the first end portion of the outer pipe, the first end portion of the outer pipe is radially contracted and is fastened to the inner pipe so as to form the first fixing portion; and
    in the fixing of the second end portion of the outer pipe, the second end portion of the outer pipe is radially contracted and is fastened to the inner pipe so as to form the second fixing portion.

4. The method of manufacturing a double pipe according to claim 1, wherein:
    in the fixing of the first end portion of the outer pipe, a first part of the inner pipe to be fixed to the first end portion of the outer pipe is radially expanded and is fastened to the first end portion of the outer pipe so as to form the first fixing portion; and
    in the fixing of the second end portion of the outer pipe, a second part of the inner pipe to be fixed to the second end portion of the outer pipe is radially expanded and is fastened to the second end portion of the outer pipe so as to form the second fixing portion.

5. The method of manufacturing a double pipe according to claim 4, further comprising:
    bonding the first end portion of the outer pipe at the first fixing portion to the inner pipe by using a brazing material, after the first fixing portion is formed; and
    bonding the second end portion of the outer pipe at the second fixing portion to the inner pipe by using a brazing material, after the second fixing portion is formed.

6. The method of manufacturing a double pipe according to claim 5, wherein:
    in the forming of the outer pipe, a taper portion is formed on an inner peripheral surface of at least one of the first end portion and the second end portion of the outer pipe to be thinned toward its tip end; and
    in the bonding of the one of the first end portion and the second end portion of the outer pipe, the brazing material is introduced into a clearance between the inner pipe and the one of the first end portion and the second end portion of the outer pipe through an enlarged space due to the taper portion.

7. The method of manufacturing a double pipe according to claim 6, wherein:
    in the forming of the outer pipe, the taper portion is formed on each inner peripheral surface of the first end portion and the second end portion of the outer pipe to be thinned toward its tip end; and
    in the bonding of each of the first end portion and the second end portion of the outer pipe, the brazing material is introduced into the clearance between the inner pipe and each of the first end portion and the second end portion of the outer pipe through the enlarged space due to the taper portion.

8. The method of manufacturing a double pipe according to claim 1, wherein:
    the forming of the first fixing portion includes a step of bonding the outer pipe to the inner pipe at the first fixing portion; and
    the forming of the second fixing portion includes a step of bonding the outer pipe to the inner pipe at the second fixing portion.

9. The method of manufacturing a double pipe according to claim 8, wherein:
    in the forming of the inner pipe, first and second parts of the inner pipe, to be bonded to the first and second end portions of the outer pipe, respectively, are expanded radially to have an outer diameter that is slightly smaller than an inner diameter of the first and second end portions of the outer pipe before the fixing.

10. The method of manufacturing a double pipe according to claim 9, wherein:

in the step of bonding the outer pipe to the inner pipe at the first fixing portion, the first part of the inner pipe is directly bonded to the first end portion of the outer pipe using the brazing material; and in the step of bonding the outer pipe to the inner pipe at the second fixing portion, the second part of the inner pipe is directly bonded to the second end portion of the outer pipe using the brazing material, after the bonding is performed.

11. The method of manufacturing a double pipe according to claim 1, wherein:

the forming of the first fixing portion includes a step of fixing a first connection member to the inner pipe and the outer pipe at the first fixing portion, and a step of bonding the outer pipe to the inner pipe through the first connection portion.

12. The method of manufacturing a double pipe according to claim 11, wherein:

the forming of the second fixing portion includes a step of fixing a second connection member to the inner pipe and the outer pipe at the second fixing portion, and a step of bonding the outer pipe to the inner pipe through the second connection portion.

13. The method of manufacturing a double pipe according to claim 1, wherein the predetermined length of the straight inner pipe is made larger than a length of the straight outer pipe.

14. The method of manufacturing a double pipe according to claim 1, wherein a helical groove extending in a longitudinal direction for the first and second round grooves is formed on the inner pipe.

15. The method of manufacturing a double pipe according to claim 1, wherein a groove width of the first round groove of the inner pipe is larger than an inner diameter of the first aperture, and a groove width of the second round groove of the inner pipe is larger than an inner diameter of the second aperture.

* * * * *